(No Model.)
N. PERKINS.
PUMP.
No. 374,995. Patented Dec. 20, 1887.
Fig. 1.
Fig. 2.
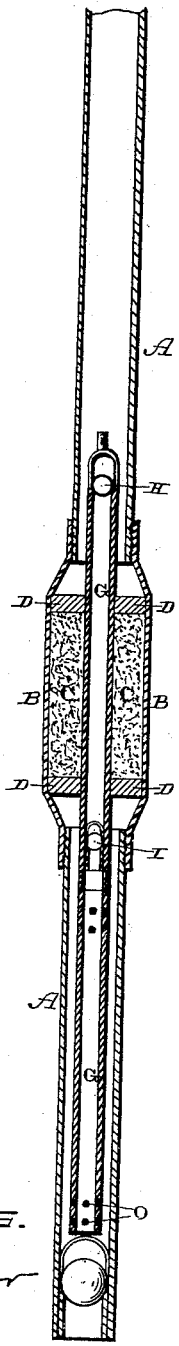
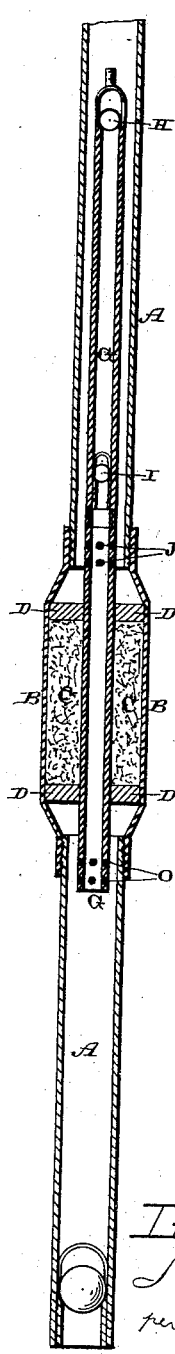
Witnesses.
L. T. Gardner
Edm. P. Ellis
Inventor.
N. Perkins,
per
F. A. Lehmann,
Atty

UNITED STATES PATENT OFFICE.

NELSON PERKINS, OF BIG SHANTY, PENNSYLVANIA.

PUMP.

SPECIFICATION forming part of Letters Patent No. 374,995, dated December 20, 1887.

Application filed August 6, 1887. Serial No. 246,319. (No model.)

*To all whom it may concern:*

Be it known that I, NELSON PERKINS, of Big Shanty, in the county of McKean and State of Pennsylvania, have invented certain new and useful Improvements in Pumps; and I do hereby declare the following to be a full, clear, and exact description of the invention, such as will enable others skilled in the art to which it pertains to make and use it, reference being had to the accompanying drawings, which form part of this specification.

My invention relates to an improvement in pumps; and it consists in the combination of the tubing with an enlarged packing-chamber, movable rings which are placed in the top and bottom of the chamber, and the packing which is placed between these rings, with a hollow plunger provided with two sets of perforations, as will be more fully described hereinafter.

The object of my invention is to place the packing for the plunger in a chamber which is provided especially for it, and which packing is compressed between the fluid from both above and below, so as to cause it to be automatically packed around the plunger while in operation, and to provide a means whereby the fluid in the tubing above the packing can be allowed to run down below the packing before the plunger is withdrawn.

Figures 1 and 2 are vertical sections of a pump embodying my invention, the parts being shown in different positions.

A represents the tubing, and B the packing-chamber, which is placed between two sections of the tubing and unites them together. This chamber B is made larger in diameter than the tubing A and of any desired length. In the chamber is placed the packing C and the two perforated metallic rings D, one at each end of the packing. These rings are vertically adjustable in the chamber B, so that the pressure of the fluid in the lower portion of the tubing A and the weight of the fluid in the upper portion of the tubing will cause the rings to approach each other, and thus compress the packing so that it will tightly grasp the sides of the working-barrel G and thus prevent any leakage while it is in operation. The working-barrel G passes through the two rings D, and the packing is hollow and is provided with an upper valve, H, and a lower valve, I. Below the lower valve the plunger extends downward any suitable distance and is open at its lower end. Through this plunger, just below the lower valve, are made a number of perforations, J, and through the plunger, near its lower end, are made a second set of perforations, O. These two sets of perforations J O must be separated a greater distance than the vertical thickness of the packing C, so that when the plunger is raised upward into the position shown in Fig 2 the fluid above the packing will flow through the perforations J and down through the plunger into the lower part of the tubing. When the plunger is almost wholly withdrawn from the packing, the fluid flows through the openings O, down through the ends of the plunger, and then through the packing and the lower ring, D.

When the plunger is withdrawn, all of the fluid settles below the packing C, and the pump is then in position at any time to have the plunger lowered into place to begin work once more. By making the packing automatic in its adjustment around the plunger, the packing adjusts itself to the plunger, and hence the tubing need never be withdrawn from the well for the purpose of packing the plunger, as is generally the case in pumps of this kind. The weight of the fluid upon the top of the packing and the pressure against its under side cause the packing to automatically adjust itself around the plunger as fast as it becomes worn away.

Having thus described my invention, I claim—

1. The combination of the tubing A, the enlarged packing-chamber B, placed between two sections of the tubing, the movable perforated rings placed in the chamber, the packing placed between the rings, and the perforated plunger which passes down through both rings and packing, substantially as shown.

2. The combination, in a pump, of the tubing, the packing-chamber, and packing and perforated packing-rings placed therein with the hollow plunger which passes down through the chamber, rings, and packing, and which is provided with a valve or valves and perforations below the valve, whereby all of the contents of the tubing above the chamber can be drained off, substantially as described.

In testimony whereof I affix my signature in presence of two witnesses.

NELSON PERKINS.

Witnesses:
A. P. ODELL,
F. S. HASTINGS.